G. P. MacGOWAN.
BABY CARRIER FOR AUTOMOBILES.
APPLICATION FILED MAR. 15, 1915.
1,217,474.
Patented Feb. 27, 1917.
2 SHEETS—SHEET 1.
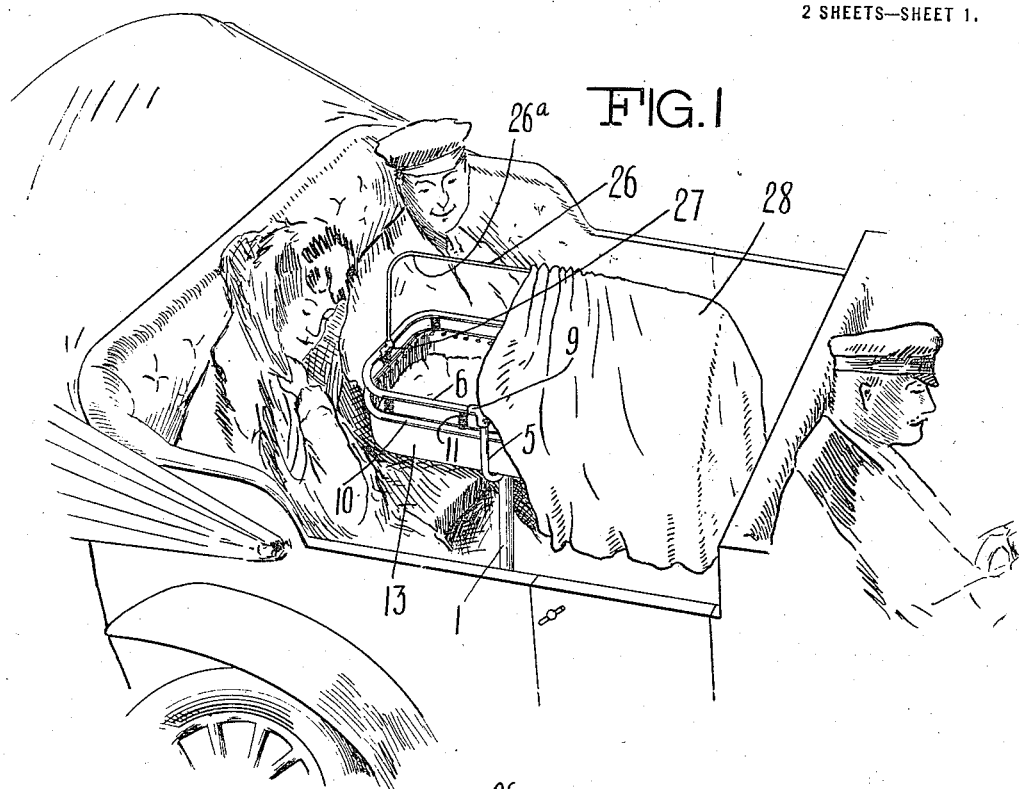
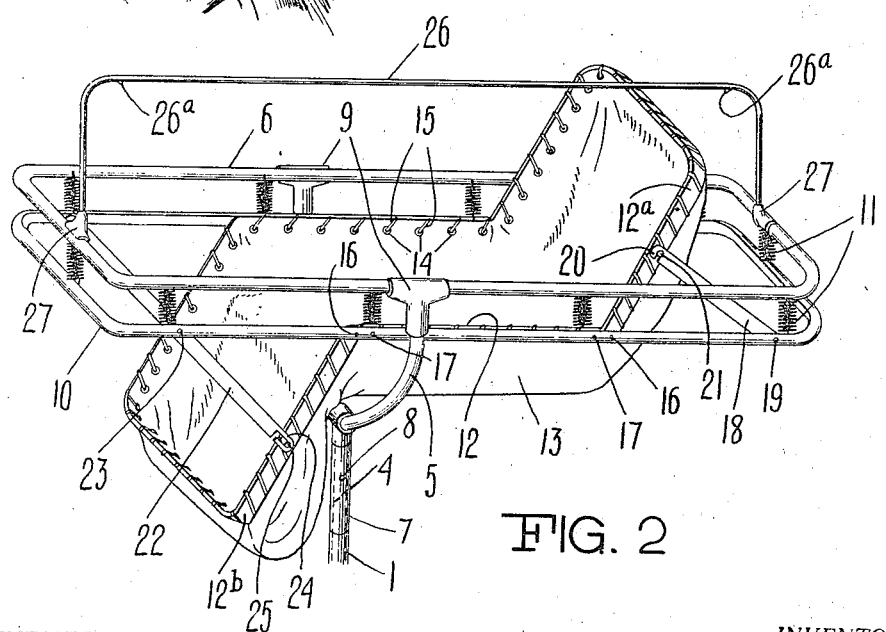
WITNESSES:
Arthur Choquet
Charlton J. Milam
INVENTOR.
George P. MacGowan,
BY
William R. Hammond.
ATTORNEY

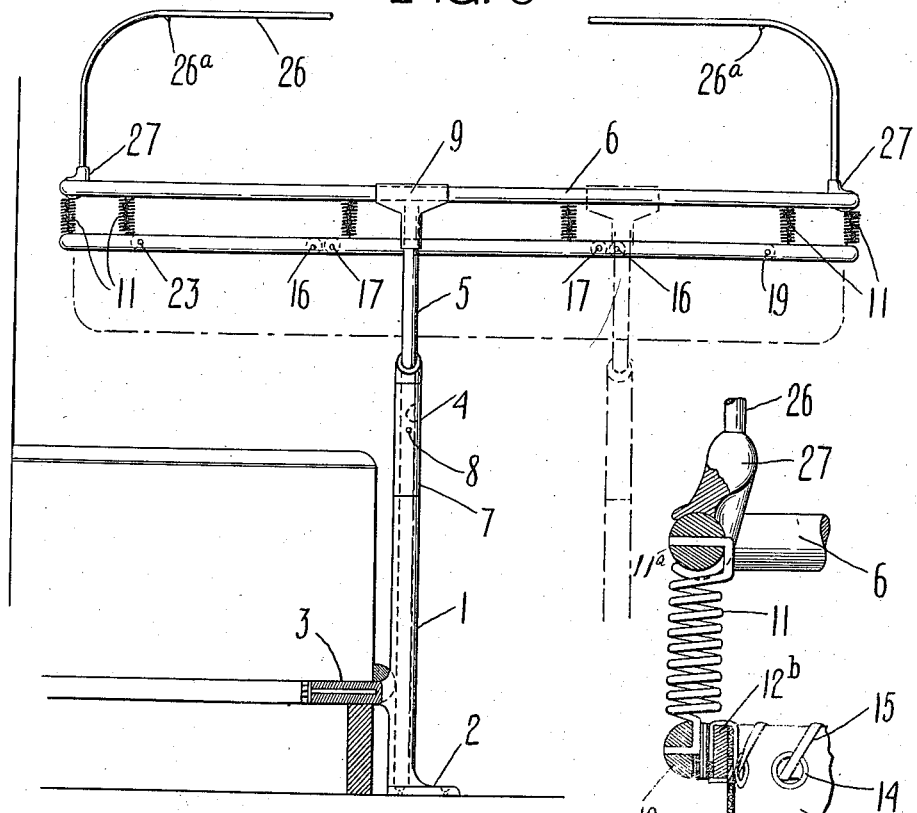

UNITED STATES PATENT OFFICE.

GEORGE P. MACGOWAN, OF NEW YORK, N. Y.

BABY-CARRIER FOR AUTOMOBILES.

1,217,474.    Specification of Letters Patent.    Patented Feb. 27, 1917.

Application filed March 15, 1915. Serial No. 14,592.

*To all whom it may concern:*

Be it known that I, GEORGE P. MAC-GOWAN, a citizen of the United States, residing in the borough of Manhattan, in the city, county, and State of New York, have invented certain new and useful Improvements in Baby-Carriers for Automobiles, of which the following is a specification.

The present invention relates to a baby carrying attachment for automobiles and like vehicles, and has for its object to provide a device of this character which embodies novel features of construction whereby it can be readily applied to any conventional form of automobile and will enable a baby or infant to be safely and comfortably carried without danger of being subjected to harmful drafts of air.

Further objects of the invention are to provide a device of this character which is comparatively simple and inexpensive in its construction, which has a yieldable mounting for absorbing all sudden shocks and jars, which can be adjusted to admit of the infant assuming either a sitting or a reclining position, and which admits of the infant being properly covered and shielded against drafts of air without causing any discomfort or inconvenience to the other occupants of the vehicle.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a perspective view showing the device as applied to an automobile and partially covered with a blanket to exclude drafts from the head end of the infant supporting basket.

Fig. 2 is a perspective view of the baby carrying device with the lower portion of the standard removed, the basket being shown as adjusted to admit of the infant assuming a sitting position.

Fig. 3 is a top plan view of the framework with the basket portion removed therefrom.

Fig. 4 is a side elevation of the framework with portions broken away and shown in section, the basket being indicated by dot and dash lines, as is also an adjusted position of the main frame with respect to the supporting yoke and standard.

Fig. 5 is an enlarged transverse sectional view through one end of the main frame and yieldably mounted frame, showing the manner of connecting the suspending springs to the two frame members.

Corresponding and like parts are referred to in the following description and indicated in all the views of the drawings by the same reference characters.

Referring to the drawings, which illustrate one embodiment of the invention, the numeral 1 designates a tubular standard which is provided at its lower end with a foot 2 adapted to be rigidly secured to the floor of the automobile by suitable fastening members. The lower end of the standard 1 is also shown as provided with lateral arms 3 adapted to be secured to the seat or some other portion of the vehicle body. A rod 4 telescopes within the tubular standard 1 and is provided at its upper end with a yoke 5 which supports the main frame 6. The rod 4 is rotatable within the tubular standard 1 and is also adapted to be telescoped therein to raise and lower the main frame 6. A collar or sleeve 7 is applied to the upper portion of the rod 4 and may be clamped by means of a set screw 8 in any adjusted position upon the rod 4 so as to hold the main frame 6 at the desired elevation.

The arms of the yoke 5 terminate in guide members 9 which slidably receive the opposite sides of the main frame 6 so that the said main frame can be moved longitudinally into any desired position. In this connection it will be noted that the guide members 9 have a sufficient length to obtain ample bearing surface upon the sides of the frame 6 for the purpose of preventing tilting of the latter even though the weight may not be evenly balanced.

Supported by the main frame 6 is a yieldably mounted frame 10 which is arranged under the frame 6 and preferably has substantially the same size and configuration as the frame 6. As indicated upon the drawing a series of coil springs 11 connect the main frame 6 to the frame 10 so as to yieldably support the latter and absorb all sudden shocks and jars. Any suitable means may be employed for connecting the springs 11 to the frames 6 and 10, such as that shown by Fig. 5, in which the extremities of the springs terminate in laterally extending arms 11ª received within corresponding openings in the sides of the frame members.

A basket carrying frame 12 is applied to the yieldably mounted frame 10, being preferably of such a size and shape as to fit closely within the same. The basket or infant supporting member 13 is formed of some flexible material such as heavy canvas and is removably applied to the frame 12 so that it can be readily replaced or cleaned when found necessary. For this purpose the edges of the fabric supporting basket 13 are shown as provided with eyelets 14 through which a suitable cord or lacing 15 is threaded as it is wrapped around the frame 12.

The basket carrying frame 12 is formed with a U-shaped head portion 12ª and a U-shaped foot portion 12ᵇ, said U-shaped portions being pivotally connected at 16 to the sides of the frame 12 and the said sides being secured by suitable fastening members 17 to the yieldably supported frame 10. When the head portion 12ª and foot portion 12ᵇ of the basket carrying frame 12 are swung into alinement with the body portion of the frame, as indicated by Figs. 1 and 3, the infant assumes a reclining position. However, by swinging the head end 12ª upwardly and the foot end 12ᵇ downwardly, an adjustment can be made which admits of the infant assuming a sitting position. Suitable folding braces 18 may be provided for holding the head end 12ª of the basket in a raised position, said braces being hinged at 19 to the frame 10 and provided with hooked ends 20 adapted to engage studs 21 upon the member 12ª. Similar folding braces 22 are provided for holding the foot end 12ᵇ of the frame 12 in proper position when lowered. The upper ends of the braces 22 are pivotally connected at 23 to the frame 10, while the lower ends thereof are hooked at 24 for engagement with studs 25 upon the member 12ᵇ. When the brace members 18 and 22 are not in use, they are folded between the adjacent sides of the frames 10 and 12. Any suitable stop or latch means may be provided for normally retaining the head end 12ª and foot end 12ᵇ of the frame 12 in alinement with the body portion of the said frame.

The main frame 6 is provided with a longitudinally extending blanket supporting arch 26 which has the ends thereof secured by suitable fastening means 27 to the ends of the frame 6. As indicated by Fig. 1, a blanket 28 may be thrown over the arched support 26 so as to drop downwardly around the sides of the infant supporting basket 13 and either partially or completely envelop the same, as may be desired. The arched support 26 holds the blanket over the basket so that it can not drop down upon the infant. The blanket can be arranged to provide a canopy for the entire basket or merely for the head end thereof as may be necessary to protect the infant from the weather or exclude drafts of air therefrom. In the present instance the arch 26 is shown as provided toward opposite ends thereof with projections 26ª which can be utilized in securing the blanket 28 in proper position so that it will not be thrown out of proper adjustment by the constant jolting or jarring of the vehicle.

Having thus described the invention, what I claim as new and desire to secure by Letters Patent, is:—

1. A baby carrying attachment for vehicles, including a main frame, supporting means therefor, a second frame yieldably connected to the main frame, a basket carrying frame applied to the second frame and formed with adjustable sections, and a flexible basket applied to the basket carrying frame.

2. A baby carrying attachment for vehicles, including a main frame, supporting means therefor, a second frame yieldably supported by the main frame, a basket carrying frame applied to the second frame and formed with swinging head and foot sections, means for holding the swinging head and foot sections in adjusted positions, and a flexible basket member attached to the basket carrying frame.

3. A baby carrying attachment for vehicles, including a main frame, a second frame arranged under the main frame, springs yieldably connecting the main frame and the second frame, supporting means for the main frame, a blanket supporting arch connecting opposite ends of the main frame and extending over the second frame, a basket carrying frame applied to the second frame and formed with adjustable sections, and a flexible basket member secured to the basket carrying frame.

4. A baby carrying attachment for vehicles, including a main frame formed with substantially parallel sides, a supporting yoke, guide members upon the arms of the supporting yoke slidably engaging the sides of the main frame so that the latter can be adjusted with respect to the supporting yoke, a second frame yieldably connected to the main frame, and a basket carried by the second frame.

5. A baby carrying attachment for vehicles, including a standard, a rod rotatable upon the standard and slidable thereon, a supporting yoke carried by the rod, a main frame carried by the said yoke, a second frame yieldably connected to the main frame, and a basket carried by the second frame.

6. A baby carrying attachment for vehicles, including a horizontally disposed main frame, a rotatable support slidably engaging the main frame so that the latter can be both rotated and moved laterally, a second frame yieldably supported by the main frame, and a basket member carried by the second frame.

7. A baby carrying attachment for vehicles, including a horizontally disposed main frame, supporting means slidably engaging the main frame so that the latter can be moved laterally, a second frame yieldably supported by the main frame, and a basket carried by the second frame.

In witness whereof I have hereunto set my hand in the presence of two subscribing witnesses.

GEORGE P. MacGOWAN.

Witnesses:
WILLIAM H. WEBSTER,
MARGARET J. OCH.